(12) United States Patent
Downey et al.

(10) Patent No.: US 6,239,711 B1
(45) Date of Patent: May 29, 2001

(54) LIVESTOCK SORTER

(76) Inventors: Peter D. Downey, Box 11, Coulter, Manitoba (CA), R0M 0G0; Brent E. Crowe, General Delivery, Deloriane, Manitoba (CA)

( * ) Notice: Subject to any disclaimer, the term of this patent is extended or adjusted under 35 U.S.C. 154(b) by 0 days.

(21) Appl. No.: 09/323,898

(22) Filed: Jun. 2, 1999

(30) Foreign Application Priority Data

Mar. 24, 1999 (CA) .................................................. 2266944

(51) Int. Cl.7 .................................................. G08B 21/00
(52) U.S. Cl. .................. 340/666; 340/573.1; 340/691.1; 340/693; 340/528; 119/155
(58) Field of Search ................................ 340/666, 573.1, 340/528, 691.1, 693; 119/155, 98, 524, 850, 843, 502, 751; 177/140, 211, 256, 244, 147

(56) References Cited

U.S. PATENT DOCUMENTS

| | | | |
|---|---|---|---|
| 3,861,359 | | 1/1975 | Pals ........................................ 119/155 |
| 4,134,366 | * | 1/1979 | Elliott ..................................... 119/155 |
| 4,138,968 | * | 2/1979 | Ostermann ............................ 119/155 |
| 4,280,448 | * | 7/1981 | Ostermann ............................ 119/155 |
| 4,288,856 | | 9/1981 | Linseth ................................... 364/567 |
| 4,427,083 | * | 1/1984 | Muddle ................................... 177/132 |
| 4,640,231 | | 2/1987 | Turner et al. ......................... 119/155 |
| 4,850,441 | * | 7/1989 | Mosdal ................................... 177/136 |
| 5,653,192 | * | 8/1997 | Sheen et al. ....................... 119/51.02 |
| 5,734,128 | * | 3/1998 | Gades et al. .......................... 177/244 |

* cited by examiner

Primary Examiner—Jeffery Hofsass
Assistant Examiner—Hung Nguyen
(74) Attorney, Agent, or Firm—Adrian D. Battison

(57) ABSTRACT

A livestock sorter is provided for sorting hogs according to weight. The livestock sorter includes a chute having an entrance gate at a back end and a pair of exit gates at a front end. Latches secure the gates in a closed position. A platform within the chute is arranged to support a hog thereon. A scale mounted beneath the platform produces a weight signal representing a magnitude of the weight of the hog on the platform. A control system includes overweight and underweight responsive elements for releasing the appropriate exit gate latch corresponding to an overweight or underweight hog in relation to a predetermined weight. The control system includes an entrance gate latch control disables the entrance gate latch in response to an absence of weight on the scale. An entrance gate sensor is included for delaying the control system until the entrance gate is closed. The control system also includes a scale delay circuit which ensures that a transient weight signal will not release the exit gate latches.

20 Claims, 13 Drawing Sheets

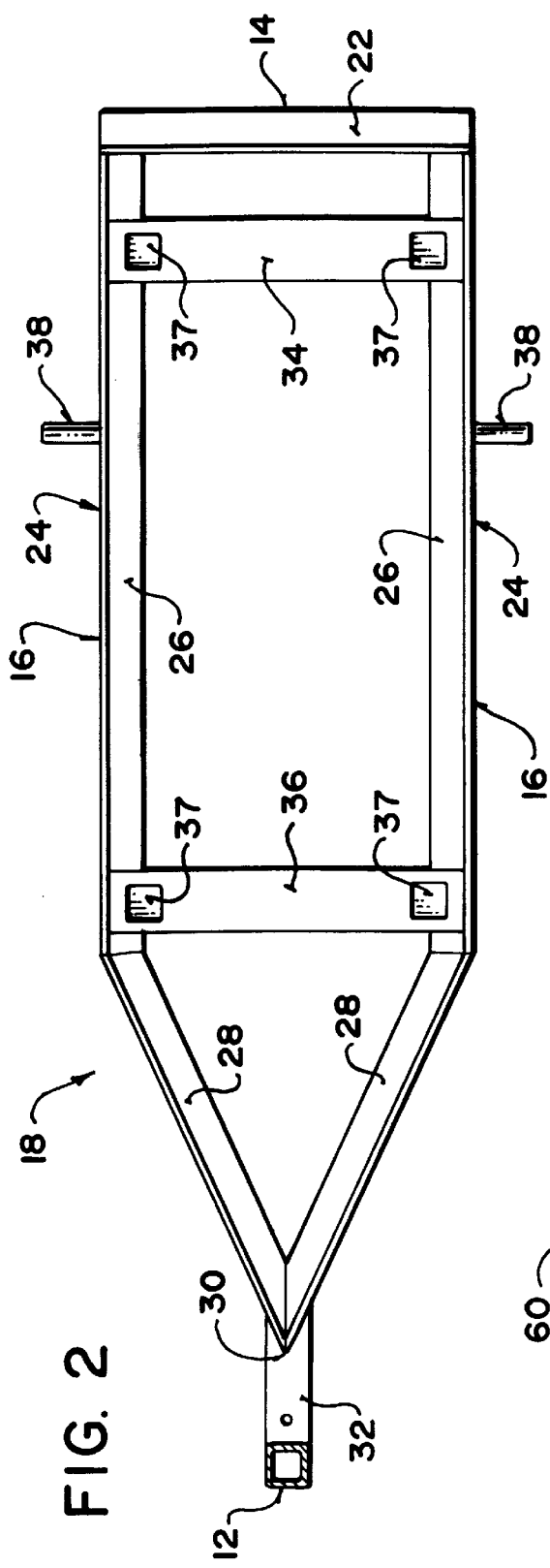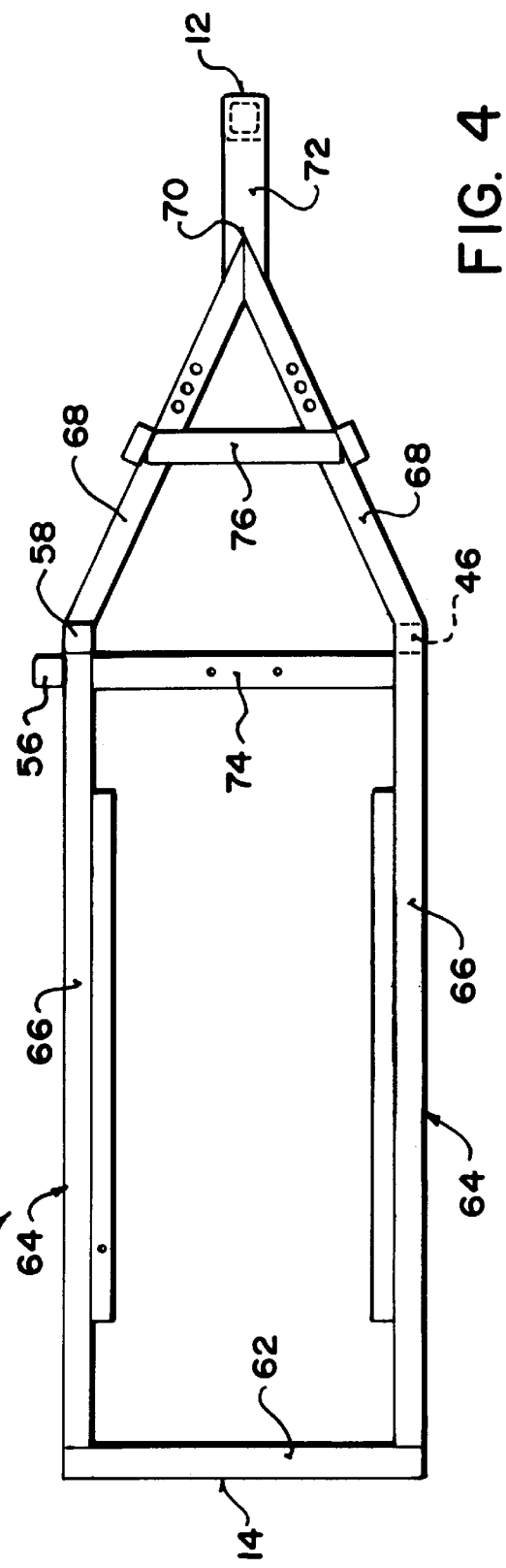

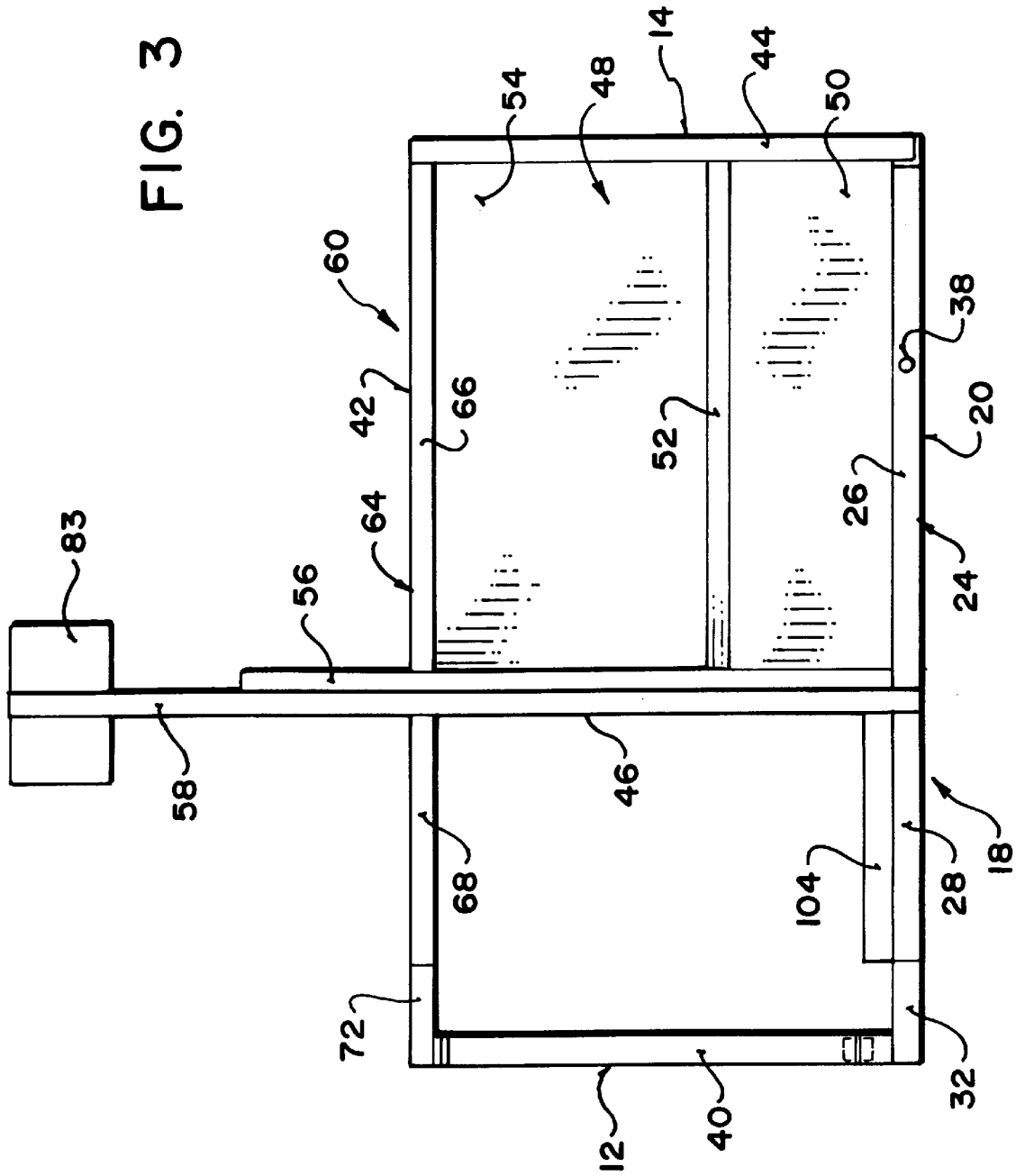

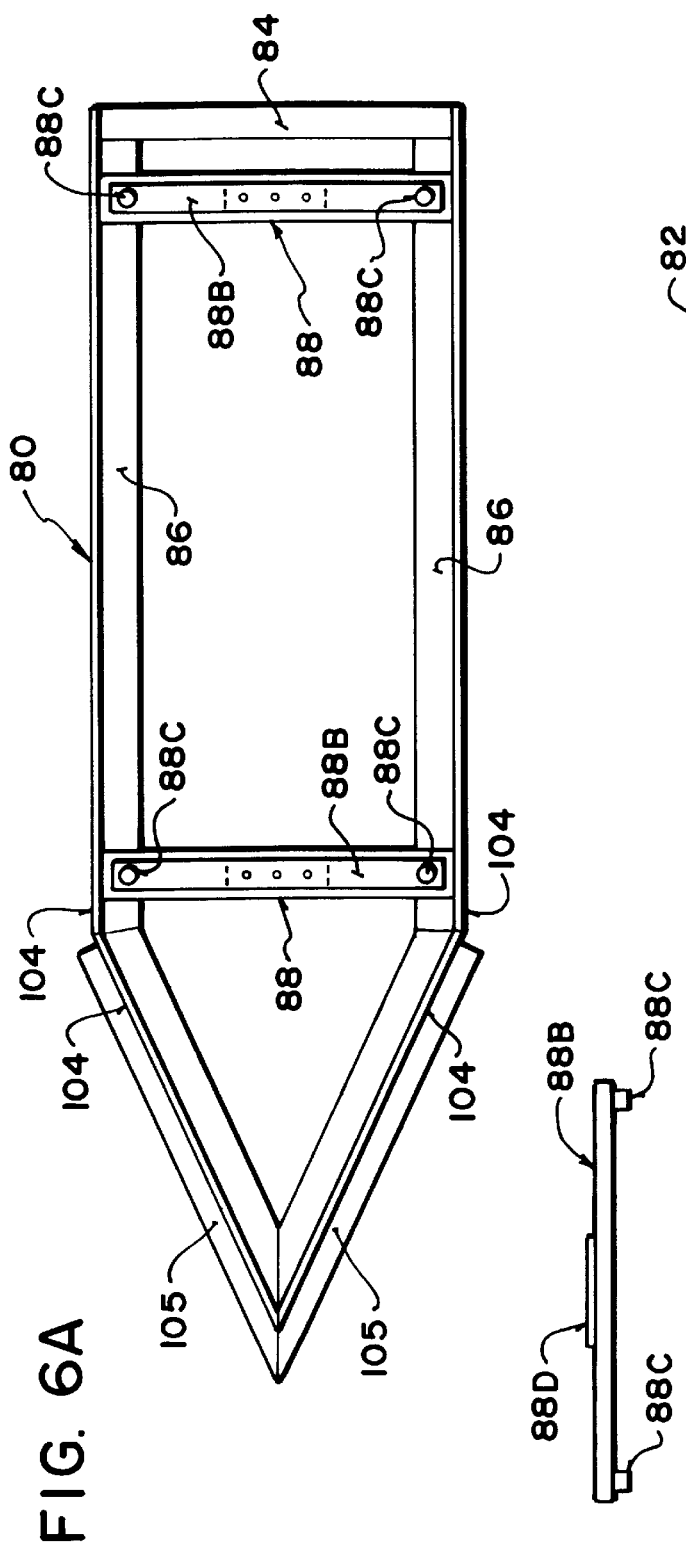
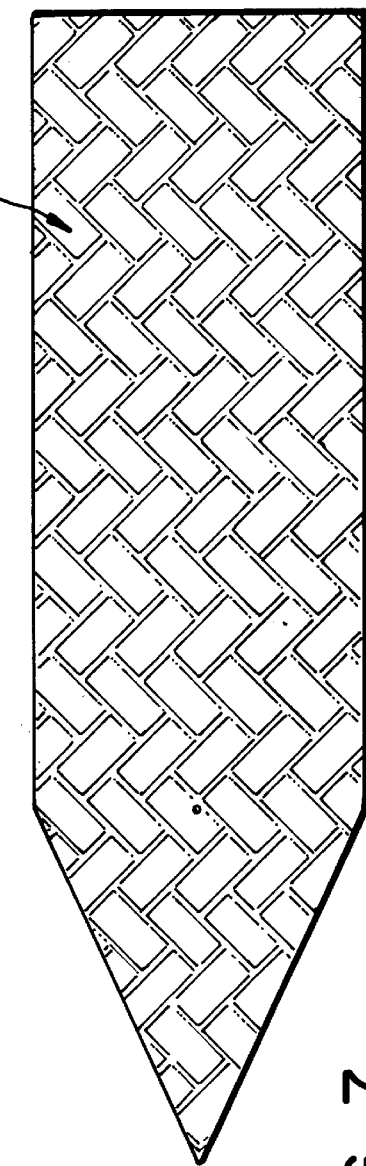
FIG. 6A
FIG. 6B
FIG. 7

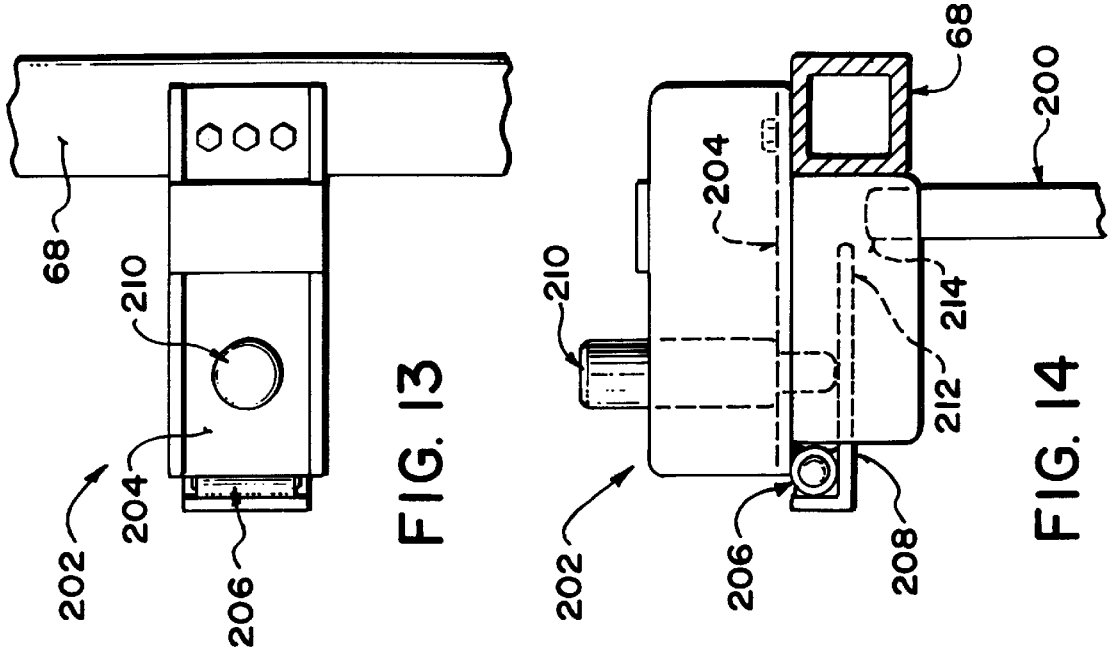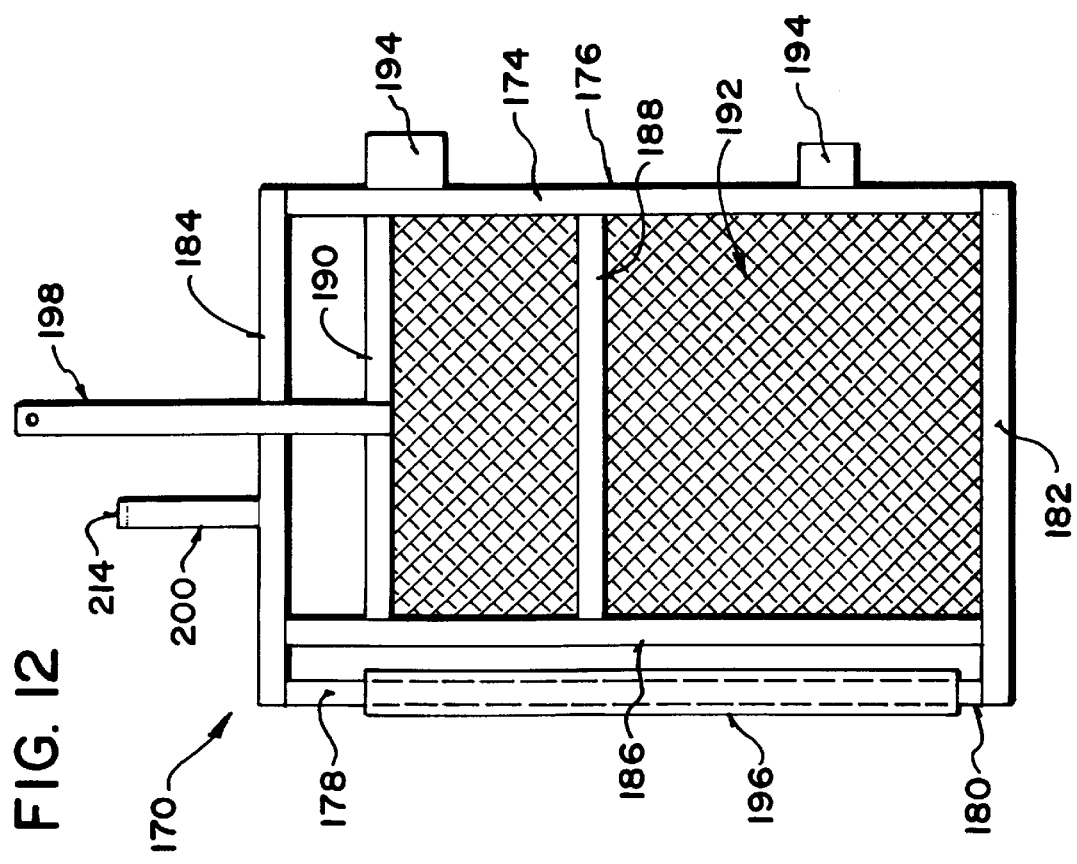

LIVESTOCK SORTER

FIELD OF THE INVENTION

This invention relates to devices for sorting livestock and more particularly to a device for sorting livestock according to different classifications of weight.

BACKGROUND

Common practice in raising livestock such as pigs or hogs is to sort the animals according to different weight classifications for determining which animals are suitable for being sold on the market.

There exists various known prior art for devices which aid in the task of sorting livestock. Of these devices some are purely mechanical in nature while others are electrically operated. In general the mechanical devices are either manually operated or require numerous links and mechanical parts to actuate appropriate gates for sorting the animals. This can result in devices which require a lot of maintenance or in devices which lack the accuracy required.

U.S. Pat. No. 4,138,968 to Ostermann provides a mechanical livestock sorter involving complex linkages. The sorter will respond to transient loadings from moving animals which may result in weight measurement errors. The entrance gate does not prevent the entry of a second animal, or prevent a second animal from placing forefeet on the scale platform which also results in weight measurement errors.

SUMMARY

According to the present invention there is provided a livestock sorter for sorting livestock according to weight, the sorter comprising:

a chute having an entrance at a back end and a pair of exits at a front end;

a platform for supporting an animal thereon;

an entrance gate positioned across the back end of the chute for movement between an open position wherein the animal is free to pass through the entrance and closed position wherein the animal cannot pass through the entrance;

an entrance gate latch for latching the entrance gate in the closed position, the entrance gate latch being arranged such that the entrance gate is free to move into the open position when the entrance gate latch is disabled;

a pair of exit gates mounted across respective exits on the front end of the chute, each gate being movable between an open position wherein the animal is free to pass through the corresponding exit and a closed position wherein the animal cannot pass through the corresponding exit;

a pair of exit gate latches for latching the respective exit gates in the closed position, each being arranged such that the respective exit gate is free to move into the open position when the respective exit gate latch is disabled; and a control system comprising:

a weight sensing device mounted beneath the platform for generating a weight signal representing a weight on the platform;

an exit gate latch control being responsive to the weight signal from the weight sensing device for disabling a predetermined one of the exit gate latches in response to an overweight signal representing a weight greater than a predetermined weight and for disabling the other exit gate latch in response to an underweight signal representing a weight less than the predetermined weight;

an entrance gate latch control for disabling the entrance gate latch in response to an absence of a weight signal from the weight sensing device.

The sorter has few mechanical parts for improved reliability while remaining compact and lightweight for portability. The control system allows full adjustability of the predetermined weight and the timing of each weighing cycle. The control system also permits adjustment of the predetermined weight to a precision which is not attainable using a mechanical system.

Preferably there is provided a gate sensing element for interrupting the passage of the weight signal from the weight sensing device to the exit gate latch control if the entrance gate is not in the closed position such that both exit gates remain in the closed position until the entrance gate is in the closed position.

The entrance gate latch may comprise a ratchet mechanism such that the entrance gate is permitted to be displaced only towards the closed position once the gate has been partially closed and the entrance gate latch is engaged.

Preferably there is provided a scale delay circuit connected to the weight sensing device such that only a steady weight signal will release one of the exit gate latches. The scale delay circuit may be a timing circuit including an adjustable resistor pot for adjusting a duration of the scale delay.

Preferably there is provided a general delay circuit connected to the exit gate control, the general delay circuit being activated when the entrance gate is in the closed position for activating the exit gate latch control only after a predetermined weighing cycle time has expired. The general delay circuit may be a timing circuit including an adjustable resistor pot for adjusting a duration of the predetermined weighing cycle time.

There may be an override switch connected to the overweight and underweight responsive elements for overriding the weight signal such that both exit gates remain latched.

A reversing switch may be connected between the exit gate latch control and the exit gate latches such that activating the switch will reverse which exit gate latch is disabled in response to the overweight signal and which exit gate latch is disabled in response to the underweight signal.

A weight signal delay circuit may be connected between the entrance gate latch control and the exit gate latch control such that the exit gate latches remain latched until the entrance gate has been latched for preventing an animal from passing through the sorter without being properly weighed.

The exit gates may be pivotally mounted on opposing sides of the chute at an outer side of each exit gate such that each exit gate extend inwards towards an inner side adjacent an inner side of the other exit gate in the closed position.

A resilient member is preferably connected between the exit gates for urging each exit gate towards the closed position.

A sleeve may be mounted on the inner side of each exit gate, the sleeve being arranged to roll along an animal's body as the animal passes therethrough such that the gate does not rub against the animal.

For sorting numerous hogs there may be provided:

a housing area connected to the entrance gate for housing livestock therein;

an underweight pen adjacent the exit gate corresponding to underweight livestock including a one way gate connecting the underweight pen to the housing area such that livestock in the underweight pen are free to return to the housing area; and an overweight pen adjacent the exit gate corresponding to overweight livestock such that livestock in the overweight pen are separated from the housing area.

There may provided transport means for raising and transporting the sorter. When using transport means the transport means may comprise:

a pair of pivot shafts extending laterally from respective bottom front corners of the frame for rotation between a transport position and a working position;

a pair of levers extending from the respective pivot shafts;

a pair of wheels mounted on the respective levers and oriented for travel in a forward direction; and a pair of handles extending from the respective pivot shafts;

wherein rotation of one of the handles about a respective axis of the pivot shaft will rotate the pivot shaft and the respective wheel mounted on the respective lever between the transport position and the working position;

wherein in the transport position the wheels engage a support surface for raising the sorter from the support surface and in the working position the wheels are free from the support surface for fixing the sorter to the support surface.

There may be provided a U-shaped bar mounted on the platform such that the bar extends upwards therefrom and prevents an animal from lying down on the platform.

The entrance gate may comprise a pair of entrance gates pivotally mounted on respective sides of the chute at outer sides of the respective entrance gates, each entrance gate extending inward towards the other entrance gate such that inner sides of the respective entrance gates are positioned adjacent each other in the closed position. When using a pair of entrance gates, the inner side of each entrance gate is preferably positioned forward the outer side in the closed position such that each gate is inclined inward and forward.

A sleeve may be mounted on the inner side of each entrance gate, the sleeve being arranged to roll along an animal's body as the animal passes therethrough such that the gate does not rub against the animal.

There may be provided an entrance gate actuator for opening the entrance gate in response to an absence of a weight signal from the weight sensing device. This encourages an animal to enter the sorter.

There may be provided a plurality of flanges extending upwards from sides of the platform. The flanges contain hog manure and other debris on the platform and protects the components of the weight sensing device.

BRIEF DESCRIPTION OF THE DRAWINGS

In the accompanying drawings, which illustrate an exemplary embodiment of the present invention:

FIG. 2 is top plan view of the bottom frame of the sorter.

FIG. 3 is a side elevational view of the frame of the sorter.

FIG. 4 is a top plan view of the top frame of the sorter.

FIG. 6A is a bottom plan view of the frame of the scale which mounts the platform thereon.

FIG. 6B is an elevational view of one of the weigh bars which mounts on the frame of the scale.

FIG. 7 is a top plan view of the platform of the scale mounted on the bottom frame of the sorter.

FIG. 12 is a side elevational view of one of the exit gates of the sorter.

FIGS. 13 and 14 are respective top plan and side elevational views of one of the front latches of the sorter.

DETAILED DESCRIPTION

Figure 1:
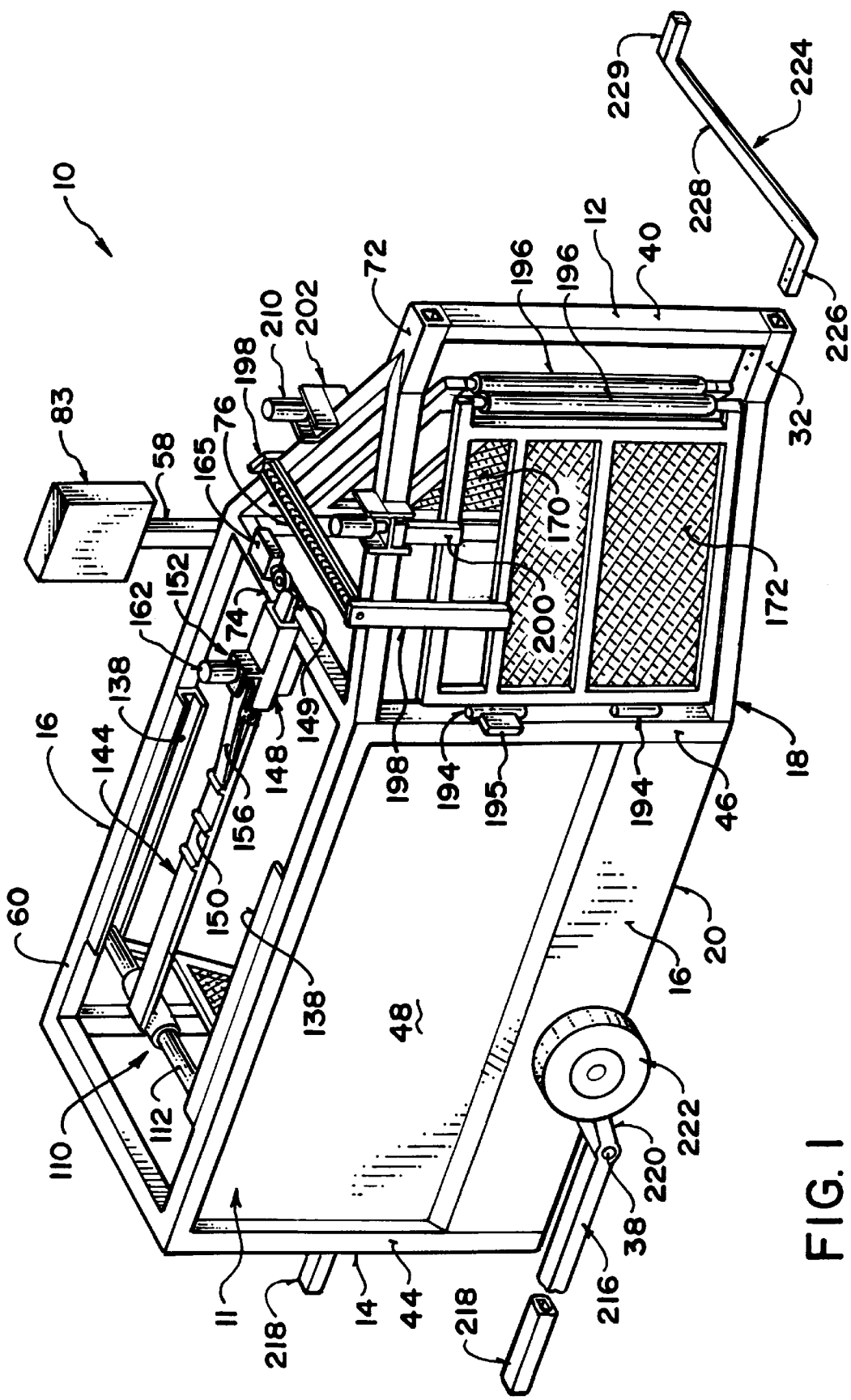
FIG. 1 is an isometric view of the livestock sorter.

Referring to the accompanying drawings, there is illustrated a livestock sorter for sorting livestock such as hogs according to weight classification, wherein the sorter is generally indicated by the number 10.

The livestock sorter includes a housing 11 having an entrance at a back end 14, a pair of exits at a front end 12 and a pair of sides 16 defining a chute therebetween extending from the front end to the back end. The housing includes a bottom frame 18 as shown in FIG. 2 at a bottom end 20 of the housing. The bottom frame 18 comprises a rear base member 22 extending across the back end 14 and a pair of side base members 24 extending from the rear base member each having a first portion 26 extending along one of the sides 16 of the housing and a second portion 28 extending inwards and forwards from an end of the first portion such that the second portions 28 are connected at the front end 12 of the housing and form a peak 30. A front bottom bar 32 extends forwards from the peak 30. A first cross bar 34 connects between the side base members 24 near the back end 14 and a second cross bar 36 connects between the side base members 24 near a point where the first and second portions of each side base member are connected. A rectangular recess 37 is located at ends of each cross bar 34 and 36 for receiving load cells therein as later described. A wheel axle 38 extends laterally outwards from each side 16 of the bottom frame near the back end 14.

Referring to FIG. 3 a front post 40 extends vertically upwards from a forward end of the front bottom bar 32 to a top side 42 of the housing. A rear post 44 extends vertically upwards from each side base member 24 to the top side 42 along the back end 14 of the housing. An intermediate post 46 extends vertically upwards from each side base member 24 to the top side 42 at the point where the first and second portions of each side base member connect. A side panel 48 extends from each rear post 44 to the corresponding intermediate post 46. Each side panel 48 includes a lower portion 50 extending vertically upwards from the first portion of the side base member to a horizontal bend 52 which extends inwards and an upper portion 54 extending vertically upwards from the horizontal bend 52 to the top side of the housing. The upper portion 54 of each side panel is spaced horizontally inwards from the corresponding lower portion 50. A cable guard 56 in the form of a channelled member is mounted adjacent to one of the intermediate posts 46 for protecting cable extending therethrough. The intermediate post 46 which is mounted adjacent to the cable guard 56 includes an extension 58 which extends upwards past the top side of the housing.

The housing includes a top frame 60 as shown in FIG. 4 across the top side of the housing. The top frame 60 includes a rear top member 62 extending across the back end 14 of the housing. A pair of side top members 64 extend from respective rear posts at the rear top member. Each side top member 64 has a first portion 66 extending along one of the sides 16 of the housing to the corresponding intermediate post and a second portion 68 extending inwards and forwards from an end of the first portion such that the second portions are connected at the front end 14 of the housing and form a peak 70 similar to the peak 30 of the bottom frame. A front top bar 72 extends forwards from the peak 70 and connects to the front post 40. An upper crossbar 74 connects between the intermediate posts along the top side 42 of the housing. A spring guard 76 connects between the second portions 68 of the side top members at a position spaced between the intermediate posts 46 and the peak 70.

Figure 5:
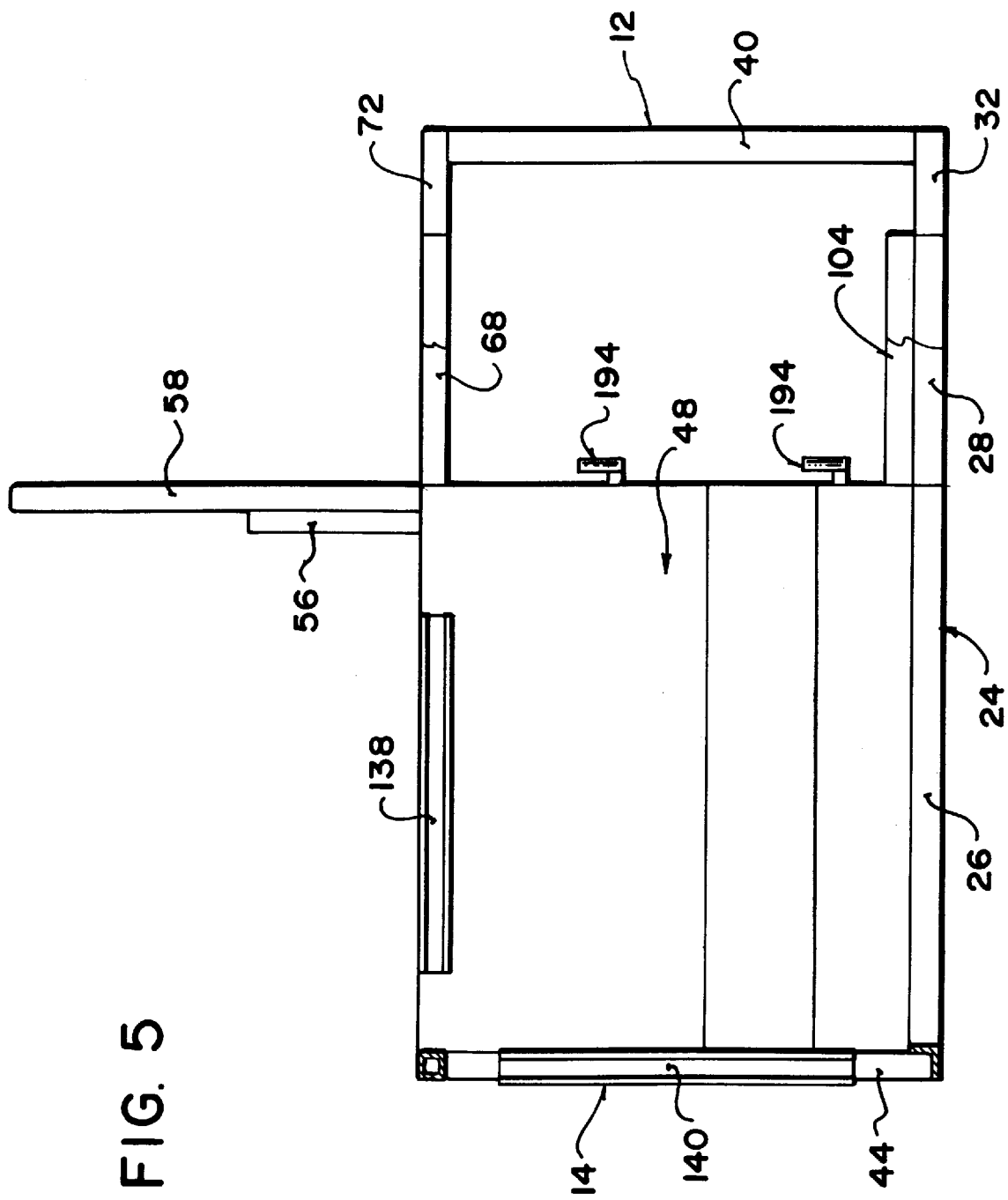
FIG. 5 is a inner side elevational view of one side of the sorter.

A scale as shown in FIG. 6 is supported on the bottom frame 18 and includes a frame portion 80 which supports a platform 82 thereon. A scale head 83 as shown in FIG. 5 is mounted on the extension 58 and includes a controller module for the scale such that it may compare hogs to any predetermined weight. The scale head and controller module are contained within a waterproof box including the electronics and power supply therein. The scale head includes elements which produce an appropriate underweight or overweight signal in response to a hog which is underweight or overweight respectively in relation to the predetermined weight. In the case of a hog equal in weight to the predetermined weight on the scale, the scale head produces an overweight signal. The scale is fully adjustable over a range of predetermined weights.

The frame portion 80 includes a rear member 84 and a pair of side members 86 arranged similar to the side base members 24 in order to form the peak 30. A pair of channels 88 are mounted on the bottom portion. The channels 88 each connect between the side members 86 and are adjacent to the respective first and second crossbars 34 and 36 of the bottom frame when the sorter is assembled. A plurality of load cells 88b are mounted within the channels 88. Each load cell 88b has a pair of feet 88c mounted on respective ends and a spacer bar 88d mounted on a top side thereof for bolting to the respective channel 88. The feet 88c each engage a rectangular base 37 on the bottom frame of the sorter as shown in FIG. 2. The load cells generate a weight signal representing a magnitude of weight on the platform and send the signal to the scale head.

A pair of manure guards 104, shown in FIG. 6, are in the form of upright flanges extending upwards from the side members 86 for preventing manure from spreading between the top and bottom portions of the scale. A pair of secondary manure guards 105 extend laterally outwards from an inclined portion of the side members 86.

The platform 82 is welded to a top side of the frame portion 80 of the scale for distributing the weight of the hog evenly across the frame portion and the plurality of loads cells mounted between the frame portion of the scale and the bottom frame.

Figure 9:
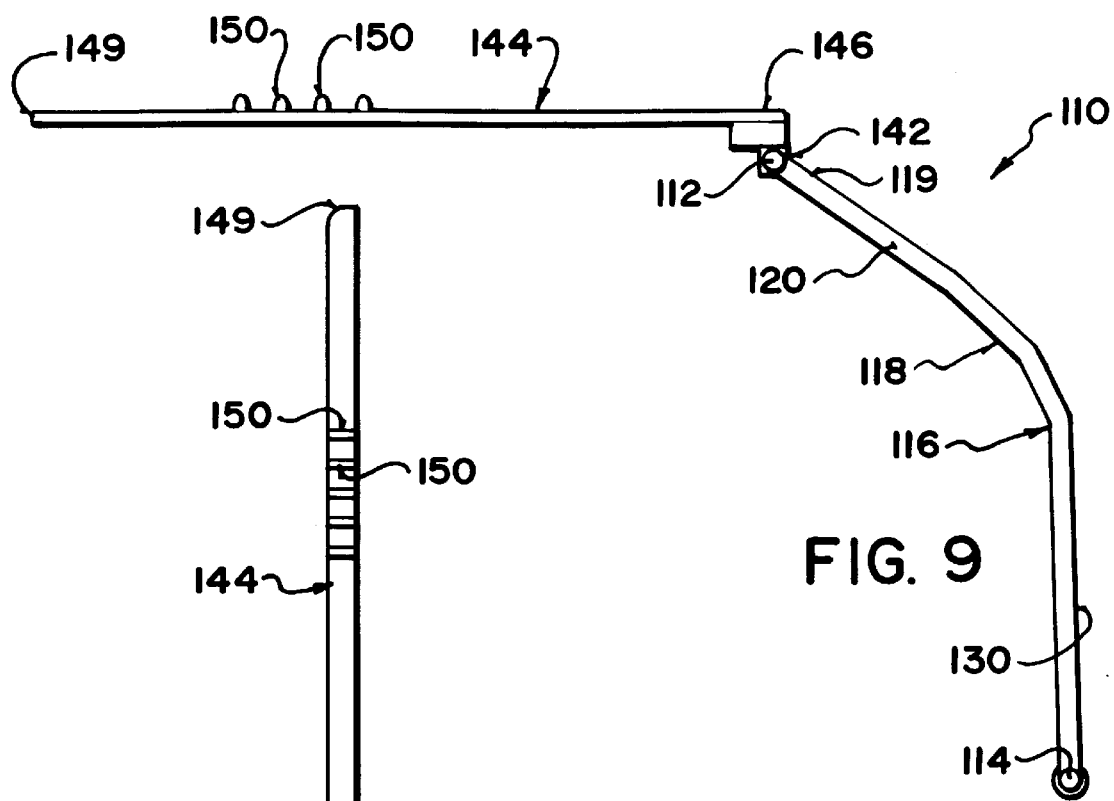
FIGS. 8 and 9 are respective inner end and side elevational views of the rear gate of the sorter.
Figure 8:
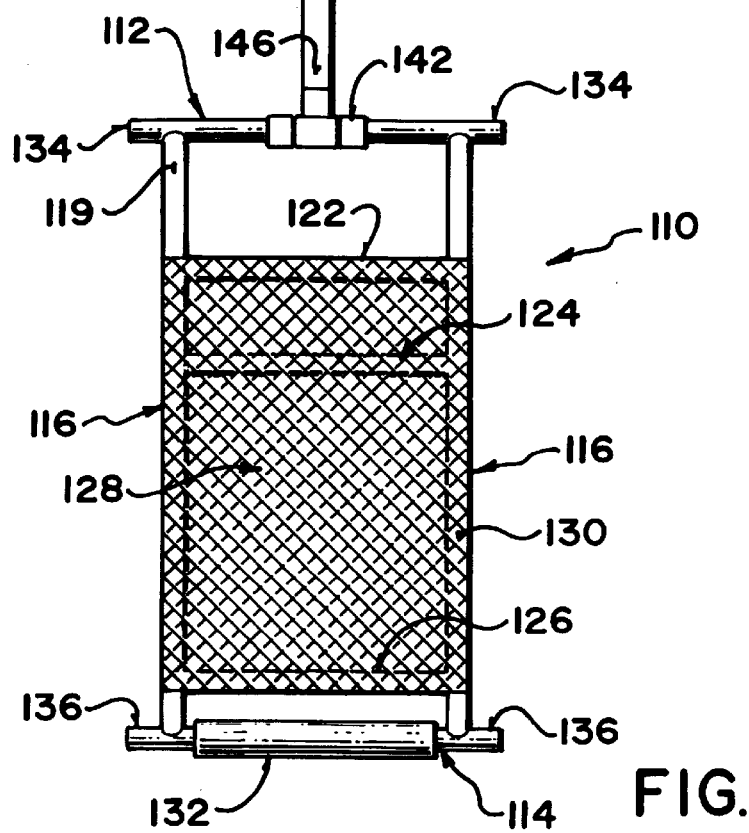

The back end 14 of the sorter includes a rear gate 110. The rear gate 110 as shown in FIGS. 8 and 9 includes a top bar 112, a bottom bar 114 and a pair of side bars 116 spaced apart and connected between the top and bottom bars. The side bars 116 include a curved portion 118 near a top end 119 such that when the gate is in a closed position at the back end 14 of the sorter, the gate extends upwards to the curved portion 118 and then curves inwards to an inclined portion 120 extending upwards and inwards at an incline in the closed position. A first cross member 122 extends between the side bars 116 near the top bar 112. A second cross member 124 extends between the side bars 116 at the curved portion 118. A third cross member 126 extends between the side bars 116 near the bottom bar 114. A sheet of wire mesh 128 is welded on an outer face 130 of the gate to extend from the first cross member 122 to the third cross member 126 following the contour of the side bars 116. A sleeve 132 is mounted on the bottom bar 114 between the side bars 116. The sleeve 132 is rotatable about the bottom bar for rolling across a back of a hog passing under the gate.

The top and bottom bars 112 and 114 are arranged to extend laterally outwards past the respective side bars 116 to form a top lug 134 at both ends of the top bar and a bottom lug 136 at both ends of the bottom bar. The top lugs 134 are slidably received within respective top channels 138. The top channels 138 as shown in FIG. 5 are members having a U-shaped cross section and extend alongside the first portion of each side top members 64 such that an open side of the channel faces inwards. The bottom lugs 136 are slidably received within respective rear channels 140. The rear channels 140 are members having a U-shaped cross section and extend alongside each rear post 44 such that an open side of the channel faces inwards. The rear gate 110 is thus slideable between open and closed positions.

A collar 142 is rotatably mounted about a midpoint of the top bar 112. A locking arm 144 is connected to the collar 142 at a first end 146 such that the locking arm 144 is pivotal about the top bar 112. The locking arm 144 is inserted in a locking sleeve 148 arranged to slidably receive the locking arm therethrough. The locking sleeve 148 is mounted on the upper crossbar 74 and arranged such that the locking arm extends horizontally from the rear gate through the sleeve. The locking arm slides within the sleeve as the rear gate is opened or closed. The locking arm 144 is rounded at a second end 149 such that the locking arm is easily inserted into the locking sleeve 148.

Figure 10:
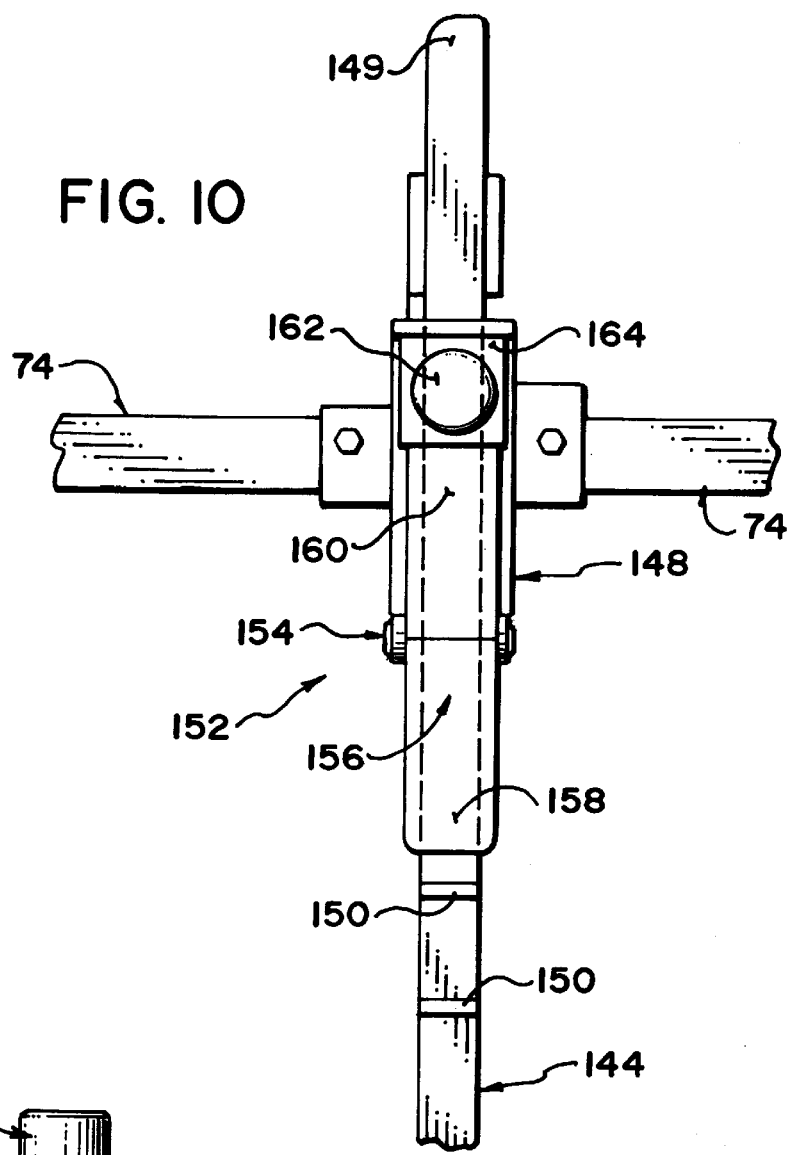
FIGS. 10 and 11 are respective top plan and side elevational views of the back latch of the rear gates of the sorter.
Figure 11:
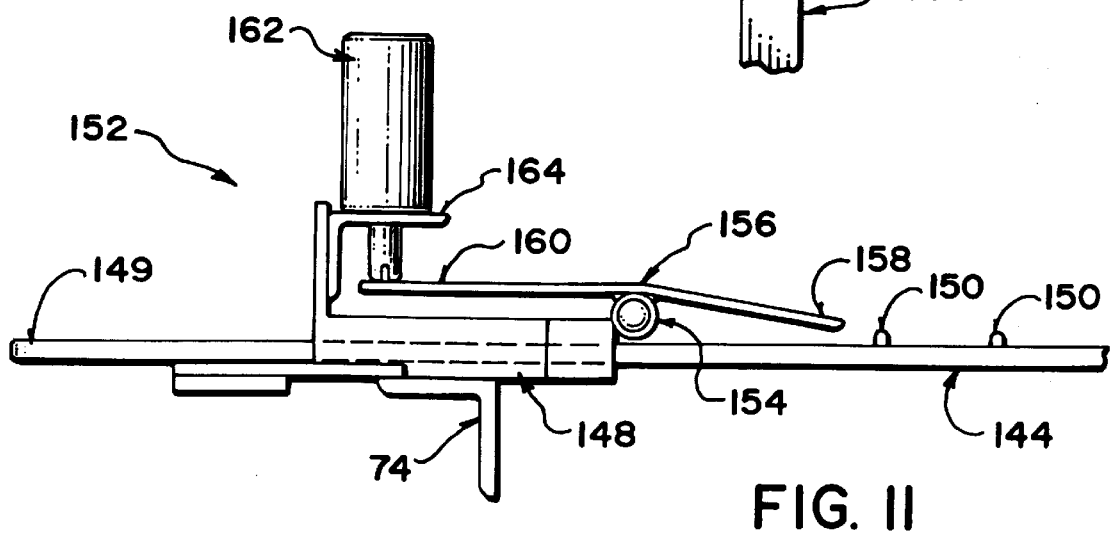

Teeth 150 are mounted on a top side of the locking arm 144. The teeth 150 co-operate with a back latch 152. The teeth 150 are positioned on the locking arm such that they only engage the back latch once the gate has been partially closed. The back latch 152 as shown in FIGS. 10 and 11 includes a hinge 154 mounted on the locking sleeve 148 near a rearward end. The hinge is for mounting a latch member 156 thereon such that a first end 158 of the latch member extends rearwards to engage the teeth 150 and a second end 160 of the latch member extends forwards to connect to a back solenoid 162. A bracket 164 of L-shaped cross-section extends upwards from a forward end of the locking sleeve 148 for a first portion and extends rearwards for a second portion over the latch member. The back solenoid 162 is supported on the second portion of the bracket 164 and extends downwards to connect to the latch member 156 for controlling pivotal movement of the latch member about the hinge 154. A back gate microswitch 165 is mounted adjacent to the back latch 152 for sensing if the entrance gate is open or closed.

Activating the back solenoid 162 will displace the second end 160 of the latch member upwards and pivot the latch member about the hinge such that the first end 158 of the latch member is displaced downwards and engages the teeth 150 of the locking arm such that the latch member and locking arm form a ratchet mechanism. With the back solenoid 162 activated the rear gate is permitted to close as the latch member is able to cam over the teeth 150. However, if the gate is pushed in the open direction the latch member will engage one of the teeth 150 and the rear gate will be prevented from being opened further when the gate is closed at least half way.

When the back solenoid 162 is deactivated the second end 160 of the latch member 156 is displaced downwards and the latch member is pivoted about the hinge such that the first end of the latch member is displaced upwards and spaced from the teeth 150. The rear gate is thus free to be opened or closed.

The front end 12 includes an underweight exit gate 170 shown in FIG. 12 and an overweight exit gate 172 similarly arranged to the underweight exit gate. The exit gates 170 and 172 each include a rear bar 174 extending along a rear side 176 and a front bar 178 extending along a front side 180. A bottom bar 182 connects the front and rear bars at a bottom end and a top bar 184 connects the front and rear bars at a top end. A secondary front bar 186 connects between the top and bottom bars 182 and 184 parallel and spaced inwards from the front bar 178. A first cross member 188 connects between a midpoint of the rear bar 174 and a midpoint of the secondary front bar 186. A second cross member 190 parallel to the top bar 184 connects between the rear bar 174 and the secondary front bar 186 at a position near the top bar 184. A wire mesh 192 extends over an inner face of the gate between the rear bar 174 and the secondary front bar 186 from the bottom bar 182 to the second cross member 190.

The exit gates 170 and 172 are each mounted to the sorter by a pair of pivots 194 mounted spaced apart on the corresponding intermediate post 46 and connected to the rear bar 174 of the exit gate. The pivots 194 mount the exit gates such that each gate is pivotal about the corresponding intermediate post between a closed position wherein the front bar 178 is adjacent to the front post 40 and an open position wherein the front bar 178 is spaced outwardly from the front post 40. A stop plate 195 is mounted on one pivot 194 of each pair for engaging the respective intermediate post when the gate is in the open position for restricting the gate from being opened too far.

A tubular sleeve 196 is mounted on each front bar 178 for rotation of the sleeve about the front bar. The tubular sleeve 196 is arranged to roll along a side of a hog passing through the gate to reduce rubbing against the hog.

A spring mounting member 198 extends upwards from a midpoint of the second cross member 190 past the top bar 184 of each exit gate. Each spring mounting member 198 connects to one end of a spring extending between the two spring mounting members 198 for urging the exit gates 170 and 172 towards each other into their respective closed positions. The spring extends along a top face of the spring guard 76 which is in the form of a flat bar.

A locking member 200 extends upwards from each top bar 184 at a position spaced towards the front side 180 for engaging a respective front latch 202. Each front latch 202 is mounted on a second portion 68 of one of the side top members 64. Each front latch 202 as shown in FIGS. 13 and 14 includes a mounting plate 204 extending horizontally outward and perpendicular to the corresponding second portion 68 of the side top member 64. A hinge 206 is mounted on an outer end of a bottom side of the mounting plate 204 for pivotally mounting a latching member 208 thereon. A front solenoid 210 mounts on a top side of the mounting plate and extends through an aperture in the mounting plate to connect to the latching member 208. The latching member 208 extends inwards from the hinge 206 towards the second portion 68 of the top side member 64 to terminate at an inner end 212 which remains spaced horizontally from the top side member.

The front solenoid 210 connects towards the inner end 212 of the latching member 208 for controlling pivotal movement of the latching member about the hinge 206 between a raised position wherein the latching member extends horizontally and a lowered position wherein the latching member extends inwards at a downwards incline. The front latch 202 is arranged to receive a top end 214 of the locking member 200 extending upwards from the corresponding exit gate 170 or 172. With the front solenoid activated the latching member 208 is in the raised position and the top end 214 of the locking member 200 is free to pass under the latching member such that the exit gate may be freely opened or closed.

When the front solenoid is deactivated the latching member 208 is in the lowered position such that the top end 214 of the locking member cannot pass under the inner end 212 of the latching member 208. When the gate is closed the inner end 212 will engage the top end 214 of the locking member and secure the corresponding exit gate closed such that the locking member extends upwards into a space between the inner end of the latching member 208 and the top side member 64. If the exit gate 170 or 172 is left open while the front solenoid is deactivated, the spring connected to the spring mounting member 198 will urge the exit gate closed such that the latching member will cam over the top end 214 of the locking member. The latching member 208 will continue to cam over the top end 214 until the locking member 200 engages the top side member 64 and the latching member will pivot into the lowered position such that the gate is secured in the closed position.

The sorter 10 includes a handle and wheel attachment as shown in FIG. 1 for transporting the sorter. In a working position a lever 216 is mounted to extend from each of the wheel axles 38 extending from respective sides 16 of the sorter. The lever 216 includes a handle 218 extending rearwards from each wheel axle, mounted for pivotal movement about the wheel axle. A wheel mounting member 220 is connected to the handle extends upwards and forwards from an end of the wheel axle 38. The wheel mounting member includes a wheel 222 rotatably mounted on a free end of the wheel mounting member 220. The wheel 222 is oriented for travel in a forwards and rearwards direction. The wheels 222 do not engage the ground in the working position.

For transportation of the sorter, the handles 218 may be pivoted upwards such that the wheel mounted member 220 is pivoted downwards and the wheels 222 engage the ground when the handles extend upwards and forwards. A front handle 224 includes a first portion 226 slidably received within the front bottom bar 32 and a second portion 228 extending upwards and forwards from the first portion for grasping. A third gripping portion 229 is mounted on an upper end of the second portion. Raising the front handle 224 when it is secured to the front bottom bar 32 will raise the front end of the sorter from the ground for easy manoeuvrability.

Figure 15:
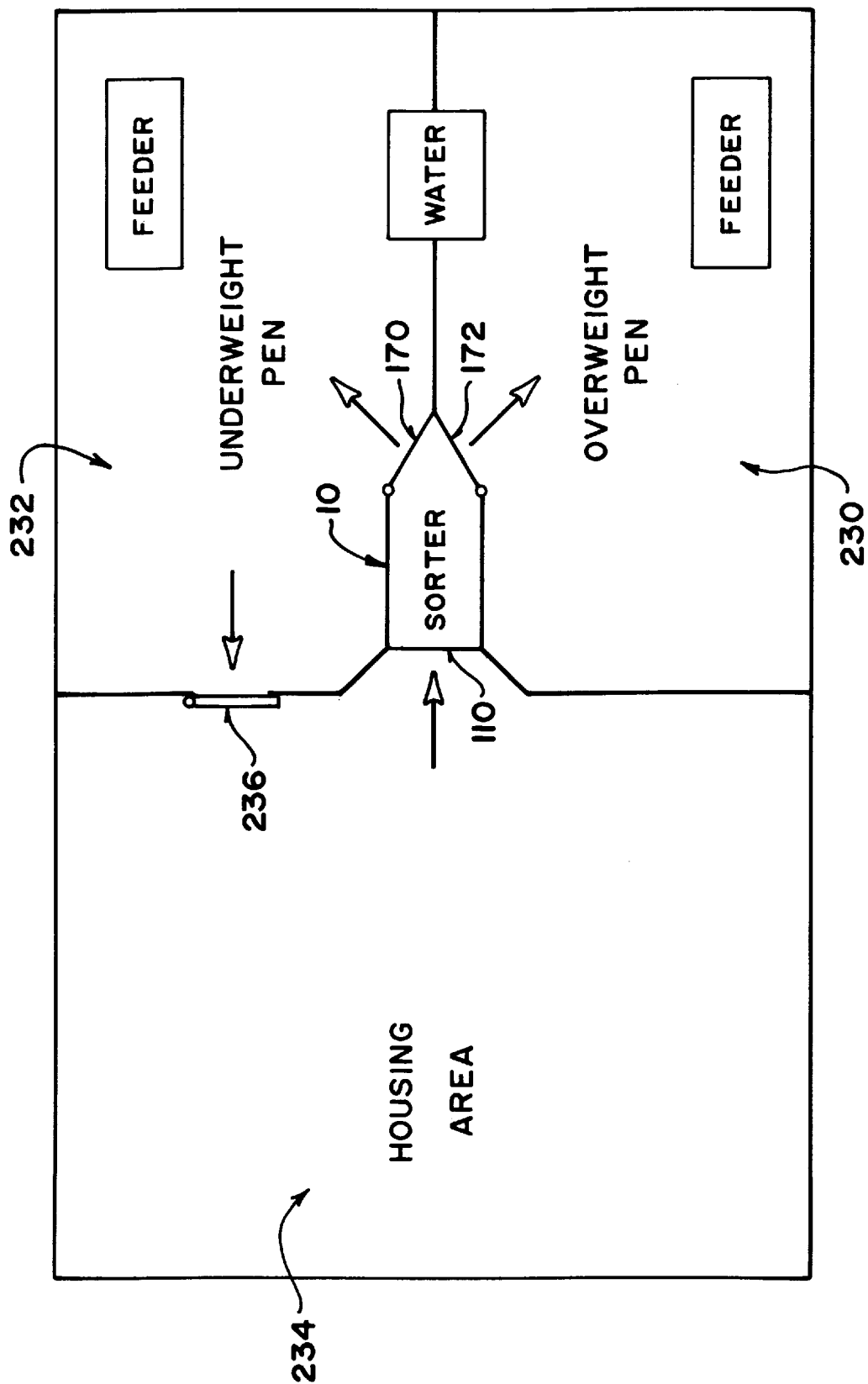
FIG. 15 is a top plan view of the sorter as it is used with an overweight and underweight pen.

The sorter 10 is intended for use in combination with an overweight pen 230, an underweight pen 232 and a housing area 234 as shown in FIG. 15. The rear end 14 of the sorter is connected to the hog housing area 234. The overweight and underweight exit gates 172 and 170 open into the respective overweight and underweight pens 230, 232.

Hogs will open the entrance gate and enter the sorter from the housing area 234 to be weighed on the scale. Once the hog has been weighed the electronic operating system will determine whether the hog is overweight or underweight and the electronic operating system will open the lock for the appropriate overweight or underweight gate to allow the hog to open the unlocked gate and enter either the overweight or underweight pen. Water and feeders provide incentive for the hogs to pass through the sorter. A one way gate 236 is connected between the underweight pen and the housing area and allows the underweight hogs to re-enter the housing area while restricting any hogs from passing through the gate 236 from the housing area to the underweight pen.

Figure 16A:
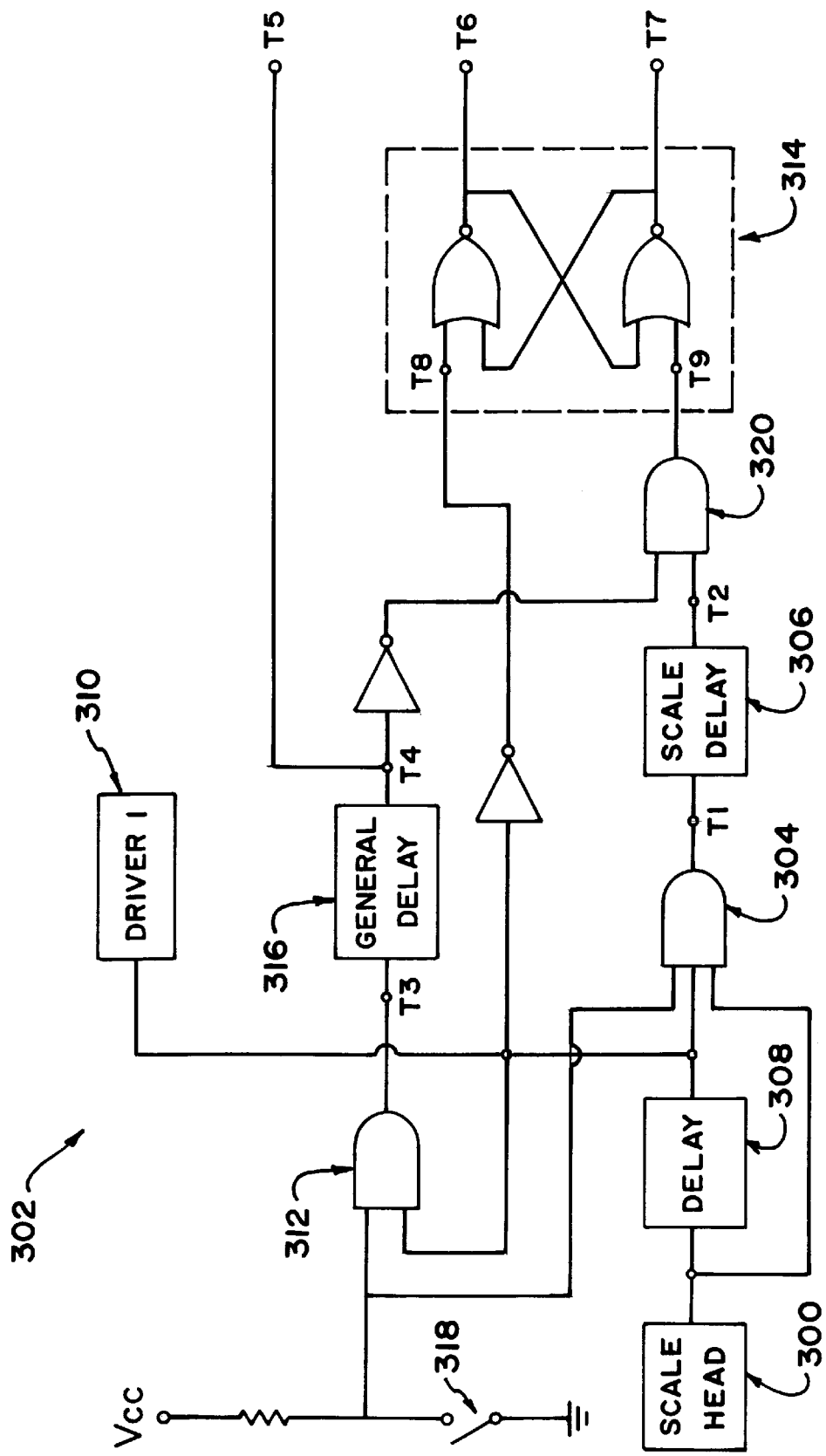
FIGS. 16, 17 and 18 are schematics of the electrical components of the sorter showing the general components, the general delay circuit and the scale delay circuit respectively.
Figure 16B:
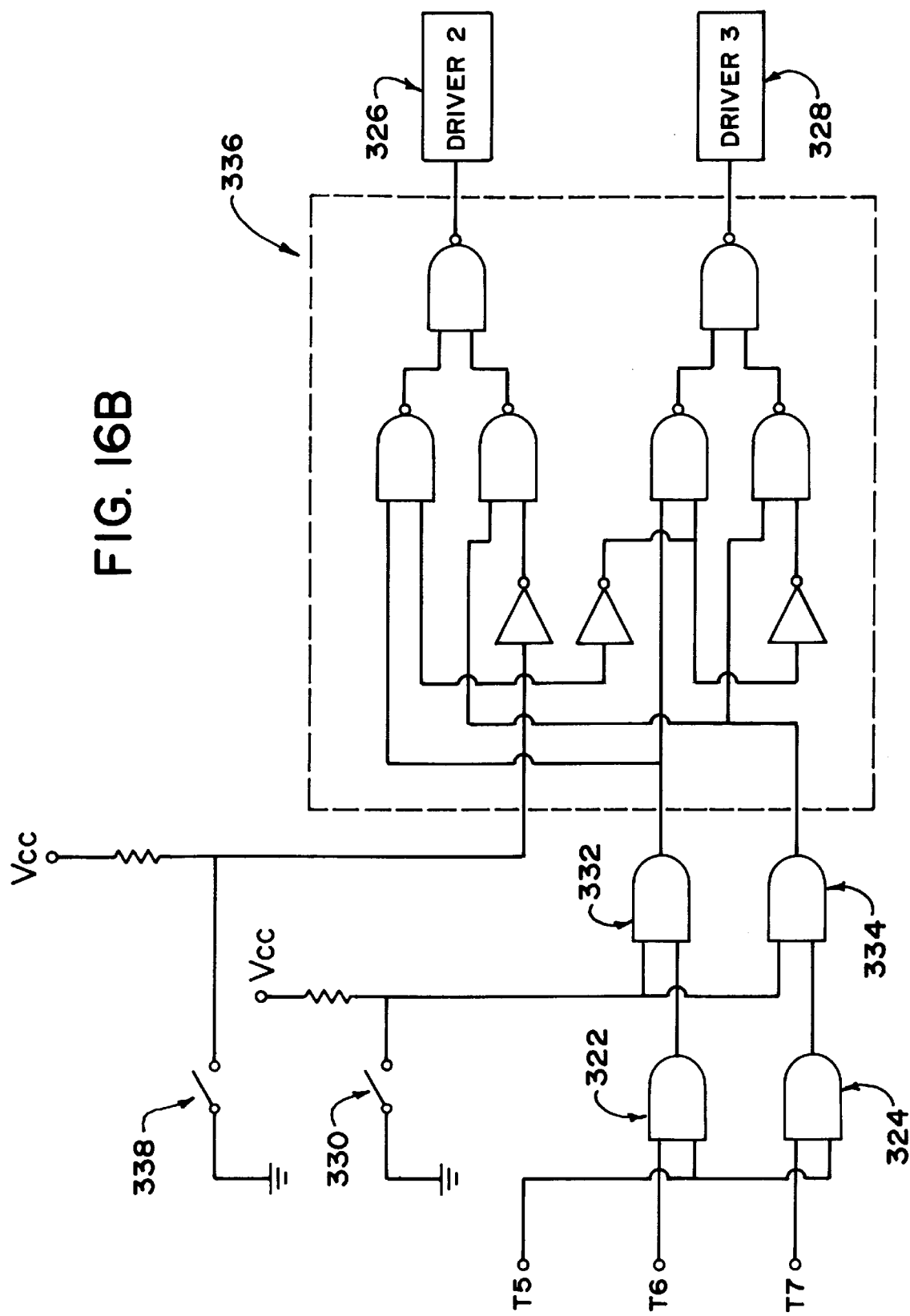
Figure 17:
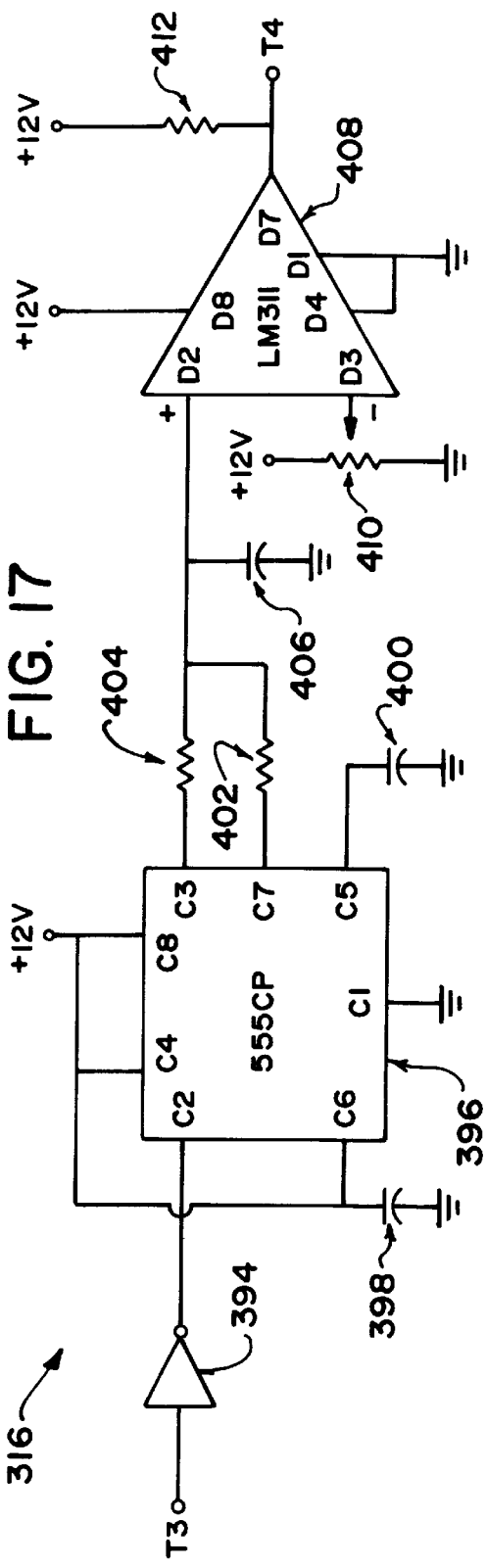
Figure 18:
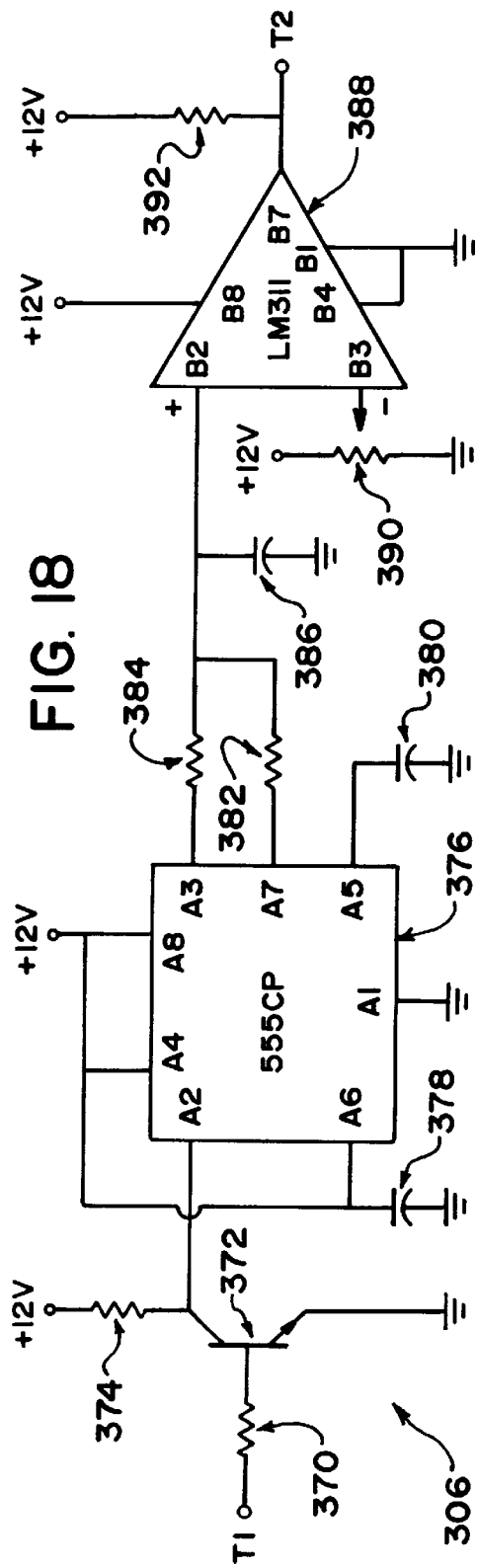

FIGS. 16, 17 and 18 are electrical schematics of the electrical components controlling the operation of the livestock sorter. Referring to FIG. 16, a first signal is introduced to the scale head 300 as a result of the load cells generating a signal in response to weight on the platform 82. The scale head 300 is connected to a programmable logic circuit which is programmed to function similarly to the schematic generally indicated by reference numeral 302.

In operation a hog enters the sorter from the housing area through the rear gate 110. As the hog steps onto the platform 82 the scale head 300 generates a signal directly to AND gate 304 which controls a scale delay circuit 306. The scale head 300 also generates a signal to a timer off delay circuit 308 from which a signal is immediately generated which connects to a first driver 310 for locking or unlocking the back latch 152 which controls the locking of the rear entrance gate 110. The timer off delay circuit thus activates the first driver 310 and the back solenoid 162 for activating the ratchet mechanism of the back latch 152 when a hog steps on the platform 82. The ratchet mechanism latches the rear gate 110 as it closes behind the first hog who enters the sorter.

The same signal generated from the timer off delay circuit 308 is also connected to an AND gate 312 and a reset terminal T8 of a latch circuit 314. The latch circuit 314 controls the locking and unlocking states of the exit gates of the sorter.

The AND gate 312 is used for activating a general delay circuit 316. A rear gate switch 318 is operatively connected to the rear gate 110 such that the switch closes with the rear gate for generating a signal once the hog has fully entered the sorter and the rear gate is closed. The signal produced by the rear gate switch 318 activates the AND gate 312 and the AND gate 304, thereby activating the general delay circuit 316 and the scale delay circuit 306. The general delay circuit 316 acts as a general timer for each weighing cycle of a single hog passing through the sorter.

When the general delay circuit 316 times out the weighing operation is complete and an overweight signal or underweight signal has been generated from the scale delay circuit. The scale delay circuit 306 ensures that only a steady overweight signal from the scale head will permit an overweight signal to be generated therefrom and input into AND gate 320. If the hog is underweight or a transient overweight signal is input into the scale delay, an underweight signal will be generated for opening the underweight exit gate.

When the general delay circuit 316 times out a signal is generated such that the AND gate 320 will set the state of the latch circuit 314 according the appropriate overweight or underweight signal received from the scale delay circuit 306 for opening the appropriate overweight or underweight exit gate.

The signal generated from the general delay circuit 316 when it times out is also connected to the inputs of a pair of AND gates 322 and 324. The AND gates 322 and 324 also receive inputs from respective terminals T6 and T7 of the latch circuit 314.

The AND gates 322 and 324 each produce an output signal for activating either a second driver 326 or a third driver 328 which each control one of the front latches 202.

An override switch 330 is provided for ensuring both exit gates remain latched. The override switch 330 generates a signal which is input into AND gates 332 and 334. The AND gates 332 and 334 interrupt the output signals from respective AND gates 322 and 324 such that opening the override switch will produce a low signal which will interrupt the output from the AND gates 322 and 324. When the output from AND gates 322 and 324 are interrupted neither the second or third drivers 326 and 328 will be activated and both exit gates will remain latched for preventing a hog from exiting the sorter if desired.

The outputs from the AND gates 332 and 334 are input into a flip flop circuit generally indicated by the reference numeral 336. The flip flop circuit 336 interrupts the signals between the AND gates 332 and 334 and the second and third drivers 326 and 328. A flip flop switch 338 provides a high or low signal input into the flip flop circuit 336 for determining which of the second and third drivers 326 and 328 will be associated with which overweight and underweight front latch 202. The flip flop circuit 336 contains inverters and NAND gates interconnected in parallel and series to redirect the output signals of the AND gates 332 and 334 to the desired second or third drivers 326 and 328.

If the override switch 330 is closed then the overweight or underweight signal generated when general delay circuit times out will be directed to the desired second or third driver as designated by the flip flop switch for releasing the appropriate front latch 202 associated to either an overweight or underweight hog.

Once the appropriate front latch 202 is released, the hog will exit the corresponding exit gate. When weight is absent from the platform the weight signal from the scale head will change to an absent weight signal accordingly. The timer delay circuit 308 will delay the absent weight signal to the first driver 310 such that the hog has sufficient time to exit the sorter and allow the exit gate to latch closed behind it before the rear gate 110 is unlatched. The timer delay circuit 308 also sends a signal to the terminal T8 for resetting the latch circuit 314 such that another weighing cycle may begin.

Referring to FIG. 18 the scale delay circuit 306 is shown in detail. The terminal T1 of the scale delay circuit connects to a resistor 370 and a transistor 372. The transistor 372 also connects to a resistor 374 which connects to a positive battery terminal and a terminal A2 of a timing circuit 376. Terminals A4, A6 and A8 of the timing circuit connect to a capacitor 378 which is grounded. Terminal A1 of the timing circuit 376 is grounded while terminal A5 connects to a capacitor 380 which is grounded. Terminals A3 and A7 are connected to parallel resistors 382 and 384. The resistors 382 and 384 are connected to a capacitor 386 and a terminal B2 of an operational amplifier 388.

The operational amplifier 388 is grounded at terminals B1 and B4. Terminal B3 of the operational amplifier 388 is connected to a resistor pot 390 which is connected between a positive battery terminal and a ground. Terminal B8 of the operational amplifier 388 is connected to a positive battery terminal. Terminal B7 of the operational amplifier 388 connects to terminal T2 of the scale delay circuit 336 as well as a resistor 392 which is connected to a positive battery terminal.

Referring to FIG. 17 the general delay circuit 316 is shown in detail. The general delay circuit 316 is arranged to time out after the scale delay circuit 306. The terminal T3 of the general delay circuit connects to a NOT gate 394 and a terminal C2 of a timing circuit 396. Terminals C4, C6 and C8 of the timing circuit connect to a capacitor 398 which is grounded. Terminal C1 of the timing circuit 396 is grounded while terminal C5 connects to a capacitor 400 which is grounded. Terminals C3 and C7 are connected to parallel resistors 402 and 404. The resistors 402 and 404 are connected to a capacitor 406 and a terminal D2 of an operational amplifier 408.

The operational amplifier 408 is grounded at terminals D1 and D4. Terminal D3 of the operational amplifier 408 is connected to a resistor pot 410 which is connected between a positive battery terminal and a ground. Terminal D8 of the operational amplifier 408 is connected to a positive battery terminal. Terminal D7 of the operational amplifier 408 connects to terminal T4 of the general delay circuit 316 as well as a resistor 412 which is connected to a positive battery terminal.

The scale delay and the general delay are both adjustable over a range of timed delay settings using the pots 390 and 410. The sorter is thus adjustable to perform appropriately to the desired conditions and to the livestock's behaviour. The scale head is also adjustable such that the sorter 10 is able to accommodate various trigger weights.

Figure 19:
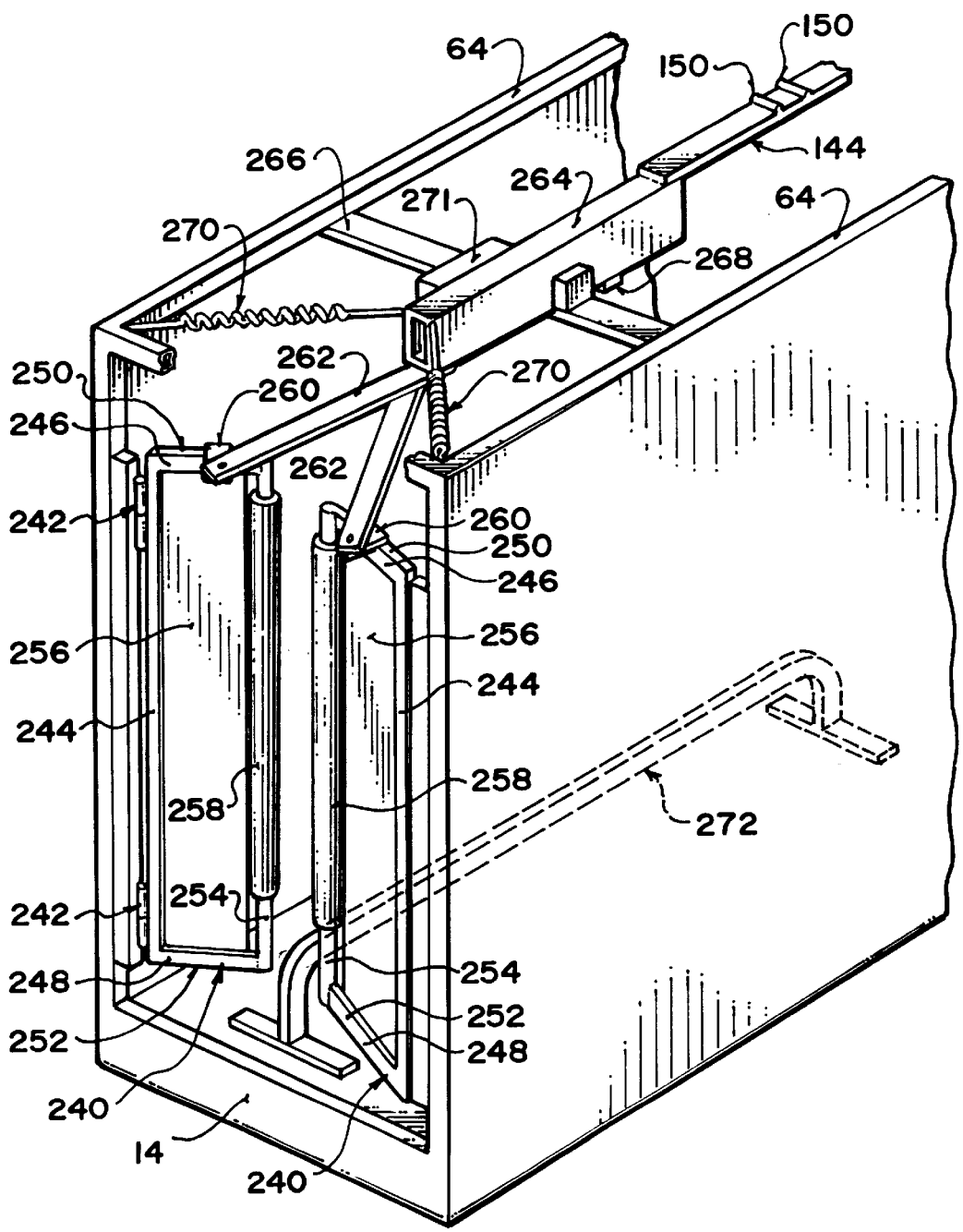
FIG. 19 is a partial isometric view of an alternative embodiment of the sorter showing the back end gate.

In a further embodiment as shown in FIG. 19 the rear gate 110 may be replaced by a pair of rear gates 240. Each gate of the pair of rear gates 240 pivotally mounted to one of the rear posts 44 by a pair of hinges 242. The gate 240 includes a first side member 244 which mounts on the hinges. A top member 246 and bottom member 248 extend inwards and forwards from respective top and bottom ends 250 and 252 of the gate. A second side member 254 extends between the top and bottom members 246 and 248 parallel and opposite to the first side member 242. A panel 256 is mounted on the gate to extend from the top member 246 to the bottom member 248.

The pair of rear gates 240 are pivotal between an open position wherein the gates extend forwards from the hinges and a closed position wherein the gates extend towards each other and partially forwards at an incline such that the second side members 254 are near each other and a hog or pig cannot fit any portion of their body therebetween. A collar 258 is rotatably mounted on each second side member 254 for rolling along the pig's body as the pig enters the sorter and forces the rear gates open when the gates are unlocked.

The rear gates 240 use a locking device similar to the first embodiment and appropriately modified. A lug 260 extends laterally outwards from the top end 250 of each rear gate 240 and perpendicular to the top member 246. A pivotal arm 262 is pivotally mounted to each lug at a first end of the pivotal arm and pivotally mounted to an end of a sliding arm 264 at a second end of the pivotal arm. The sliding arm 264 is mounted in line with the locking arm 144 of the first embodiment. A cradle 266 is mounted to the side top members 64 for slidably supporting the sliding arm 264. A protrusion 268 is mounted on a bottom side of the sliding arm to act as a stop to the sliding motion of the sliding arm. The protrusion 268 is arranged to engage the cradle when the rear gates 240 are in the closed position. A pair of springs 270 are connected to the end of the sliding arm 264 and to respective top front corners of the frame for urging the gates towards the closed position. Opening the rear gates 240 will slide the locking arm 144 forwards and closing the rear gates 240 will slide the locking arm 144 rearwards just as in the first embodiment. The ratchet mechanism including the locking sleeve 148, the teeth 150 and the back latch 152 is identical to the first embodiment for appropriately locking the rear gates 240.

An actuator 271 is mounted on the sliding arm 264 connected to the rear gates. The actuator recoils the rear gates into the open position in response to a signal from the scale head indicating that there is no longer a hog on the scale. Opening the rear gate automatically provides added incentive for the next hog to enter the sorter. The actuator is also arranged to close the rear gate when the scale indicates that a hog has entered the sorter.

A blocking bar 272 is mounted on a top side of the platform 82. The blocking bar 272 is a U-shaped member mounted on the floor at ends of the bar. The blocking bar 272 extends upwards at one end from the platform at a position adjacent the rear gates 240 then forwards parallel to the platform and then downwards to mount to the platform at another end. The blocking bar 272 is arranged such that the pig or hog entering the sorter must straddle the blocking bar and is thus prevented for laying down in the sorter. The blocking bar also prevents a second hog from entering the sorter between the legs or under a first hog entering the sorter to be weighed.

While some embodiments of the present invention have been described in the foregoing, it is to be understood that other embodiments are possible within the scope of the invention. The invention is to be considered limited solely by the scope of the appended claims.

What is claimed is:

1. A livestock sorter for sorting livestock according to weight, the sorter comprising:

a chute having an entrance opening at a back end and a pair of exit openings at a front end;

a platform for supporting an animal thereon;

an entrance gate positioned across the back end of the chute, the entrance gate being movable between an open position in which the animal is free to pass through the entrance opening and a closed position in which the entrance gate spans the entrance opening such that the animal cannot pass through the entrance opening;

an entrance gate latch movable between an enabled position in which the entrance gate is locked in the closed position and the entrance gate cannot be displaced towards the open position and a disabled position in which the entrance gate is free to be displaced towards the open position;

a pair of exit gates mounted across respective exit openings on the front end of the chute, each exit gate being movable between an open position in which the animal is free to pass through the corresponding exit opening and a closed position in which the exit gate spans across corresponding exit opening and animal cannot pass through the corresponding exit opening;

a pair of exit gate latches associated with the respective exit gates, each exit gate latch being movable between an enabled position in which the corresponding exit gate is locked in the closed position and restricted from displacement towards the open position and a disabled position in which the respective exit gate is free to move into the open position; and a control system comprising:

a weight sensing device mounted beneath the platform for generating a weight signal representing a weight on the platform;

an exit gate latch control being responsive to the weight signal from the weight sensing device, the exit gate latch control being arranged to disable a predetermined one of the exit gate latches in response to an overweight signal representing a weight greater than a predetermined weight and being arranged to disable the other exit gate latch in response to an underweight signal representing a weight signal less than the predetermined weight; and an entrance gate latch control arranged to position the entrance gate latch in the enabled position in response to receipt of a weight signal from the weight sensing element and position the entrance gate latch in the disabled position in response to an absence of a weight signal from the weight sensing device.

2. The livestock sorter according to claim 1 wherein there is provided a gate sensing element for interrupting the passage of the weight signal from the weight sensing device to the exit gate latch control if the entrance gate is not in the closed position such that both exit gates remain in the closed position until the entrance gate is in the closed position.

3. The livestock sorter according to claim 1 wherein the entrance gate latch comprises a ratchet mechanism such that the entrance gate is permitted to be displaced only towards the closed position once the gate has been partially closed and the entrance gate latch is enabled.

4. The livestock sorter according to claim 1 wherein there is provided a scale delay circuit connected to the weight sensing device such that only a steady weight signal will release one of the exit gate latches corresponding to the overweight signal.

5. The livestock sorter of according to claim 1 wherein there is provided a general delay circuit connected to the exit gate control, the general delay circuit being activated when the entrance gate is in the closed position for disabling the exit gate latch control only after a predetermined weighing cycle time has expired.

6. The livestock sorter according to claim 1 wherein there is provided an override switch connected to overweight and underweight responsive elements of the exit gate latches for overriding the weight signal such that both exit gates latches remain enabled.

7. The livestock sorter according to claim 1 wherein there is a reversing switch connected between the exit gate latch control and the exit gate latches such that activating the switch will reverse which exit gate latch is disabled in response to the overweight signal and which exit gate latch is disabled in response to the underweight signal.

8. The livestock sorter according to claim 1 wherein there is provided a weight signal delay circuit connected between the entrance gate latch control and the exit gate latch control such that the exit gate latches remain latched until the entrance gate has been latched for preventing an animal from passing through the sorter without being properly weighed.

9. The livestock sorter according to claim 1 wherein the exit gates are pivotally mounted on opposing sides of the chute at an outer side of each exit gate such that each exit gate extends inwards towards an inner side adjacent an inner side of the other exit gate in the closed position.

10. The livestock sorter according to claim 9 wherein there is provided a resilient member connected between the exit gates for urging each exit gate towards the closed position.

11. The livestock sorter according to claim 9 wherein there is provided a sleeve mounted on an inner end of each exit gate, the sleeve being arranged to roll along an animal's body as the animal passes therethrough such that the gate does not rub against the animal.

12. The livestock sorter according to claim 1 wherein there is provided:

a housing area adjacent the entrance gate for housing livestock therein;

an underweight pen adjacent the exit gate corresponding to underweight livestock including a one way gate connecting the underweight pen to the housing area such that livestock in the underweight pen are free to return to the housing area; and an overweight pen adjacent the exit gate corresponding to overweight livestock such that livestock in the overweight pen are separated from the housing area.

13. The livestock sorter according to claim 1 wherein there is provided transport means for raising and transporting the sorter, the transport means comprising:

a pair of pivot shafts extending laterally from respective bottom front corners of the frame for rotation between a transport position and a working position;

a pair of levers extending from the respective pivot shafts;

a pair of wheels mounted on the respective levers and oriented for travel in a forward direction; and a pair of handles extending from the respective pivot shafts;

wherein rotation of one of the handles about a respective axis of the pivot shaft will rotate the pivot shaft and the respective wheel mounted on the respective lever between the transport position and the working position;

wherein in the transport position the wheels engage a support surface for raising the sorter from the support surface and in the working position the wheels are free from the support surface for fixing the sorter to the support surface.

14. The livestock sorter according to claim 1 wherein there is provided a U-shaped bar mounted on the platform such that the bar extends upwards therefrom and prevents an animal from lying down on the platform.

15. The livestock sorter according to claim 1 wherein the entrance gate comprises a pair of entrance gates pivotally mounted on respective sides of the chute at outer sides of the respective entrance gates, each entrance gate extending inward towards the other entrance gate such that inner sides of the respective entrance gates are positioned adjacent each other in the closed position.

16. The livestock sorter according to claim 15 wherein the inner side of each entrance gate is positioned forward an outer side in the closed position such that each gate is inclined inward and forward.

17. The livestock sorter according to claim 15 wherein there is provided a sleeve mounted on the inner side of each entrance gate, the sleeve being arranged to roll along an animal's body as the animal passes therethrough such that the gate does not rub against the animal.

18. The livestock sorter according to claim 1 wherein there is provided an entrance gate actuator for opening the entrance gate in response to an absence of a weight signal from the weight sensing device.

19. A livestock sorter for sorting livestock according to weight, the sorter comprising:

a chute having an entrance opening at a back end and a pair of exit openings at a front end;

a platform for supporting an animal thereon;

a pair of exit gates mounted across the respective exit openings on the front end of the chute, each exit gate being movable between an open position in which the animal is free to pass through the corresponding exit opening and a closed position in which the animal cannot pass through the corresponding exit opening;

a pair of exit gate latches associated with the respective exit gates, each exit gate latch being movable between an enabled position in which the corresponding exit gate is locked in the closed position and restricted from displacement towards the open position and a disabled position in which the respective exit gate is free to move into the open position;

a control system comprising:

a weight sensing device mounted beneath the platform for generating a weight signal representing a weight on the platform;

an exit gate latch control being responsive to the weight signal from the weight sensing device for disabling a predetermined one of the exit gate latches in response to an overweight signal representing a weight greater than a predetermined weight and for disabling the other exit gate latch in response to an underweight signal representing a weight signal less than the predetermined weight; and a plurality of guard flanges, each extending upwards from a respective side of the platform arranged to obstruct passage of debris along the respective sides of the platform from a top side of the platform to the weight sensing device mounted beneath the platform.

20. The livestock sorter according to claim 1 wherein there is provided a lateral flange extending laterally outward from the platform adjacent each exit opening.

* * * * *